(12) United States Patent
Maggi et al.

(10) Patent No.: US 8,195,788 B2
(45) Date of Patent: Jun. 5, 2012

(54) METHOD FOR CHECKING THE FUNCTIONALITY OF A CONTENT DELIVERY NETWORK RELATED SYSTEM AND COMPUTER PRODUCT

(75) Inventors: Natascia Maggi, Turin (IT); Antonio Nasuto, Turin (IT)

(73) Assignee: Telecom Italia S.p.A., Milan (IT)

( * ) Notice: Subject to any disclaimer, the term of this patent is extended or adjusted under 35 U.S.C. 154(b) by 986 days.

(21) Appl. No.: 10/496,223

(22) PCT Filed: Nov. 13, 2002

(86) PCT No.: PCT/EP02/12695
§ 371 (c)(1),
(2), (4) Date: Jul. 7, 2004

(87) PCT Pub. No.: WO03/045029
PCT Pub. Date: May 30, 2003

(65) Prior Publication Data
US 2005/0021706 A1    Jan. 27, 2005

(51) Int. Cl.
*G06F 15/173* (2006.01)
(52) U.S. Cl. ......................... 709/224; 709/223
(58) Field of Classification Search .......... 709/204–205, 709/223–224, 217–218, 226
See application file for complete search history.

(56) References Cited

U.S. PATENT DOCUMENTS

| | | | | |
|---|---|---|---|---|
| 6,038,623 | A | 3/2000 | Schutte | 710/100 |
| 6,108,703 | A * | 8/2000 | Leighton et al. | 709/226 |
| 6,144,996 | A | 11/2000 | Starnes et al. | |
| 6,222,752 | B1 | 4/2001 | Kumar | 365/49.15 |
| 6,996,616 | B1 * | 2/2006 | Leighton et al. | 709/226 |
| 7,010,578 | B1 * | 3/2006 | Lewin et al. | 709/217 |
| 7,010,590 | B1 * | 3/2006 | Munshi | 709/224 |
| 7,240,100 | B1 * | 7/2007 | Wein et al. | 709/214 |
| 7,293,093 | B2 * | 11/2007 | Leighton et al. | 709/226 |
| 2002/0169868 | A1 * | 11/2002 | Lopke et al. | 709/224 |
| 2003/0093523 | A1 * | 5/2003 | Cranor et al. | 709/225 |
| 2005/0021862 | A1 * | 1/2005 | Schroeder et al. | 709/246 |
| 2008/0222291 | A1 * | 9/2008 | Weller et al. | 709/226 |

FOREIGN PATENT DOCUMENTS

| | | |
|---|---|---|
| WO | WO 01/39000 | 5/2001 |
| WO | WO 01/52483 | 7/2001 |
| WO | WO 01/55879 | 8/2001 |
| WO | WO 01/59647 | 8/2001 |
| WO | WO 01/61966 | 8/2001 |
| WO | WO 01/65402 | 9/2001 |

OTHER PUBLICATIONS

"Web Security, Privacy & Commerce, 2nd Edition" Simson Garfinkel, O'Reilly & Associates, Nov. 2001, 2nd edition, chapter 8.5.* "Web Security, Privacy & Commerce, 2nd Edition" Simson Garfinkel, O'Reilly & Associates, Nov. 1, 2001, 2nd edition, <http://proquest.safaribooksonline.com/search>, chapter 8.5.*
"The Measured Performance of . . . " K.L. Johnson Computer Communications 24 (2001) p. 202-206.
"Enhanced Streaming Services in a Content Distribution Network" IEEE Service Center Jul. 2001 p. 66-75.
"On the Use and Performance of Content Distributeion Networks" AT&T Labs Research XP002950378 Aug. 2001; p. 1-19.

* cited by examiner

*Primary Examiner* — Brian J Gillis
(74) *Attorney, Agent, or Firm* — Banner & Witcoff, Ltd.

(57) ABSTRACT

To check the functionality of a content Delivery Network in which the contents made available by at least a Content Provider are made available to a plurality of surrogate sites (POP1, POP2, POP3, . . . ) in the aforesaid contents are included fictitious contents ($\phi$, $\phi(i)$, $\phi_n$) which are selectively recognizable but inaccessible to users and Content. Providers. The functionality of the network is checked verifying the availability of the aforesaid fictitious contents ($\phi$, $\phi(i)$, $\phi_n$) at the surrogate sites (POP1, POP2, POP3, . . . ). The aforesaid fictitious contents are marked with information pertaining to time (TTL), and localization. It is thus possible to verify the updating of the contents made available at the various surrogate sites (POP1, POP2, POP3, . . . ) as well as the proper operation of the network from the geographic point of view, also in regards to the delivery of the contents in conditions of minimum service time.

19 Claims, 4 Drawing Sheets

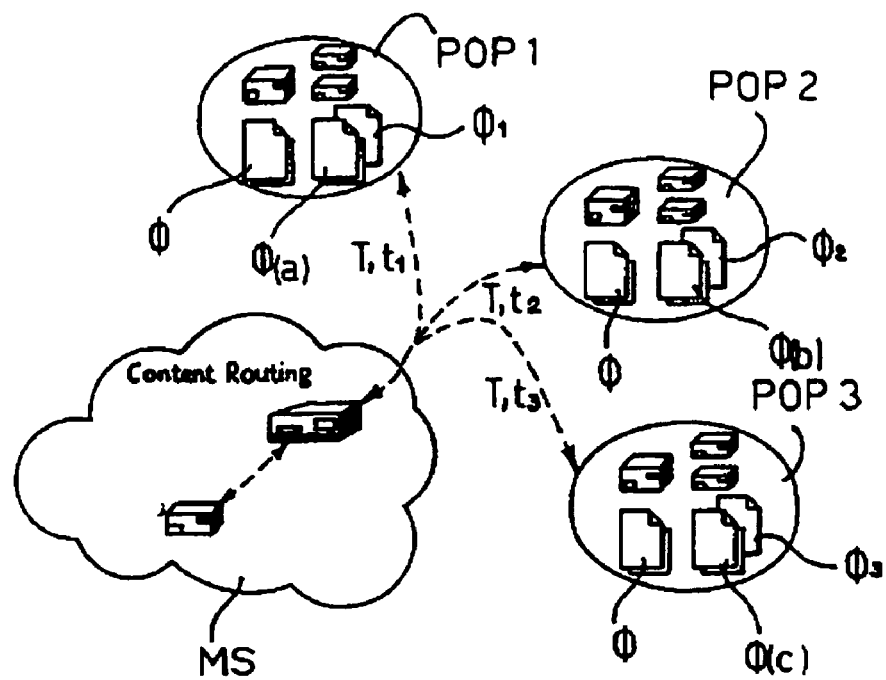
Fig_1
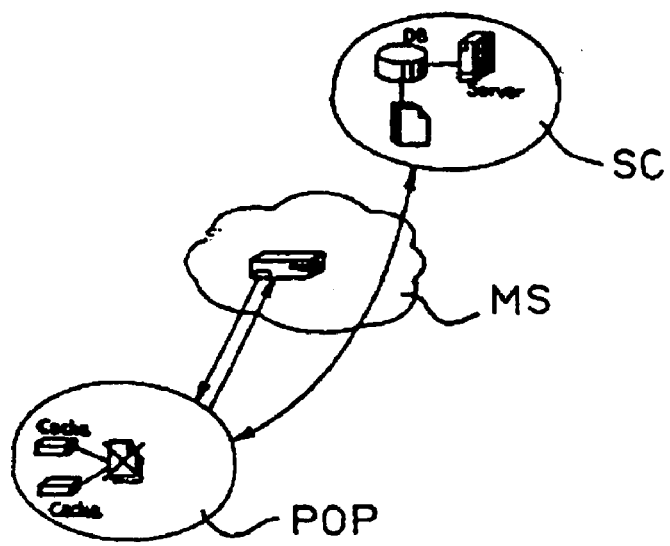
Fig_2

Fig_5
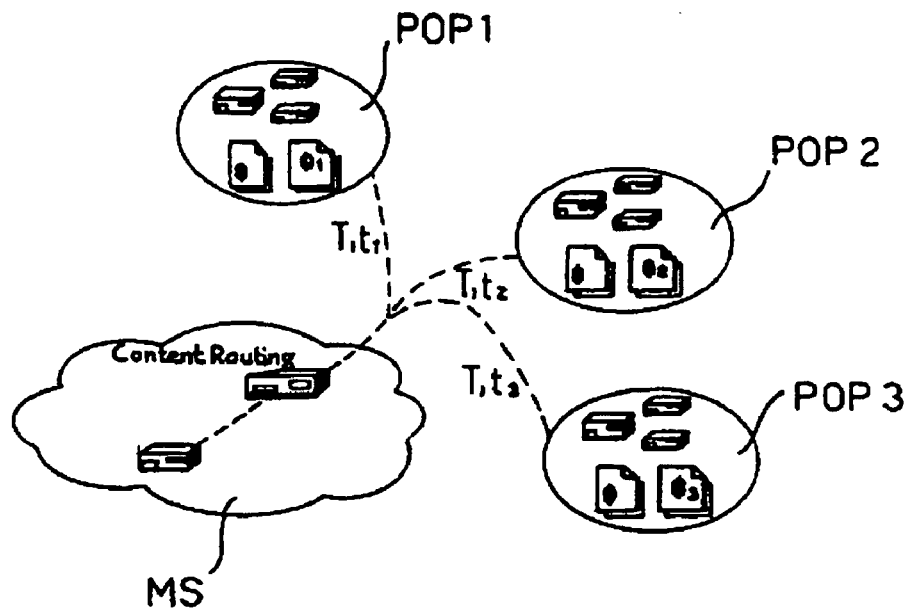
Fig_6
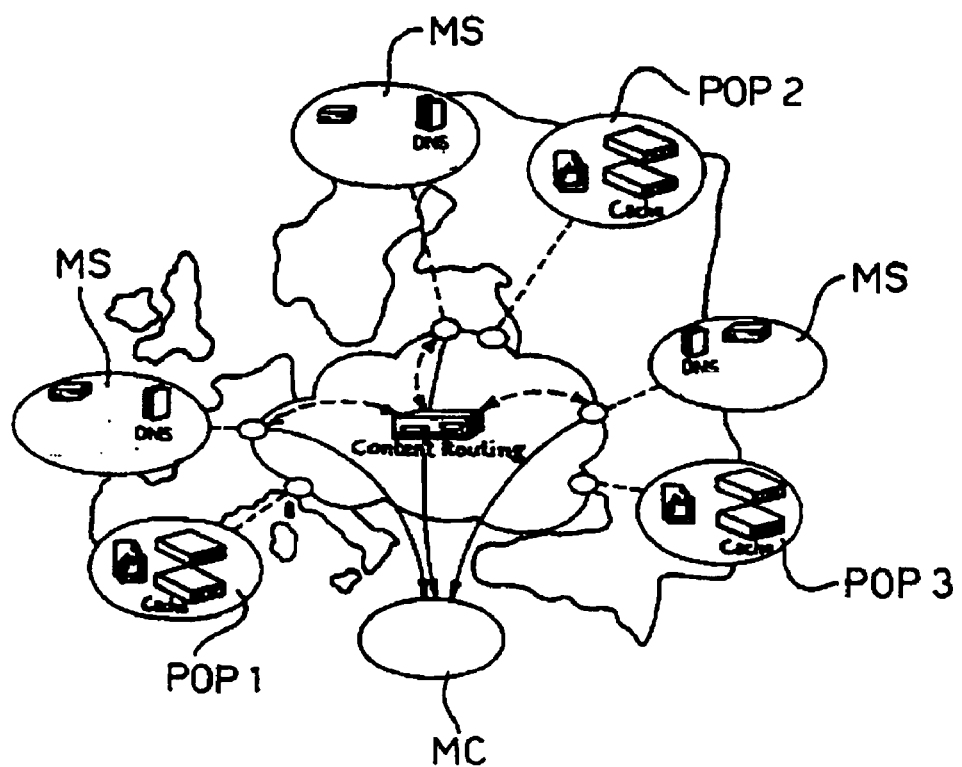

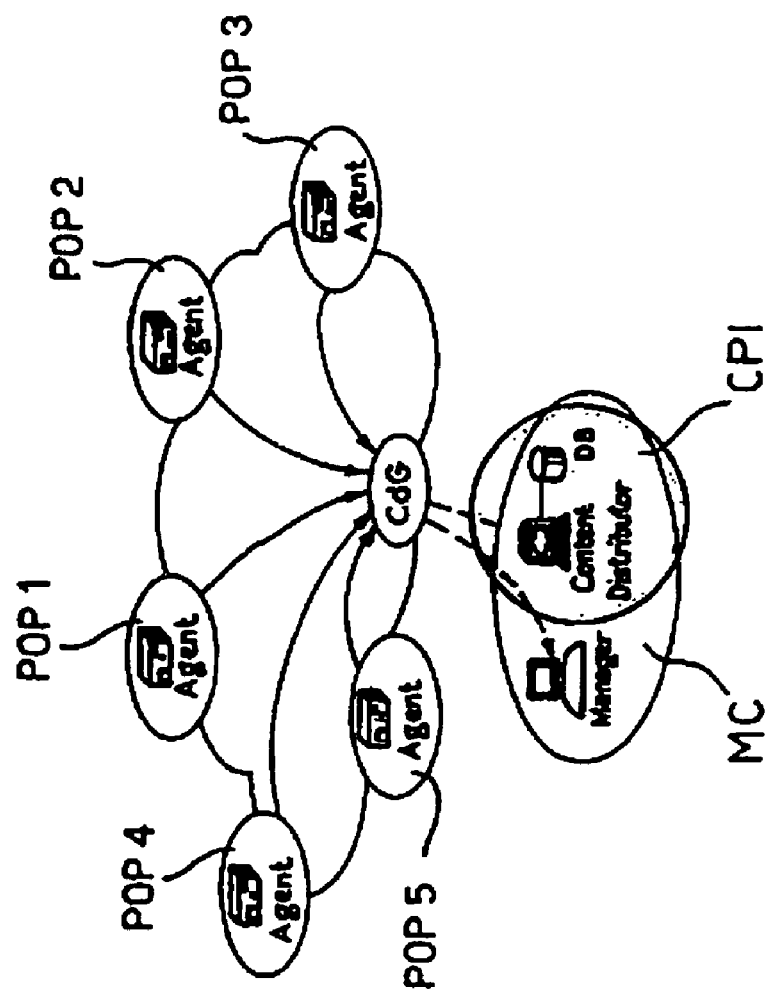

METHOD FOR CHECKING THE FUNCTIONALITY OF A CONTENT DELIVERY NETWORK RELATED SYSTEM AND COMPUTER PRODUCT

CROSS REFERENCE TO RELATED APPLICATIONS

This application is the US national phase of PCT application PCT/EP02/12695, filed 13 Nov. 2002, published 30 May 2003 as WO 2003/045029, and claiming the priority of Italian patent application TO2001A001082 itself filed 19 Nov. 2001, whose entire disclosures are herewith incorporated by reference.

FIELD OF THE INVENTION

The present invention relates to the checking of the functionality of a Content Delivery Network, or CDN.

BACKGROUND OF THE INVENTION

In a CDN, the contents made available by the various Content Providers (CP) are distributed to a plurality of sites, is usually called "surrogate" sites, accessible to the users. The purpose of this is to locate the above-described contents as close to the final users as possible, in order to reduce access times.

BACKGROUND ART

U.S. Pat. No. 6,144,996 discloses a solution aimed at assuring a minimum performance level in the delivery of contents on a network. The related system offers connection services together with accessory services, called acceleration services, aimed at providing an accelerated distribution of the contents whilst guaranteeing a minimum level of service.

The related components are able to manage and monitor the use of processing resource in such a way as to prevent performance from dropping below a minimum level. This solution essentially entails readying intermediate level computers that communicate through a first network with the local user computers and through a second network with remote computers destined to provide the required information. The purpose of the intermediate level computers is essentially to meet, to the extent possible, demand at the local level.

Various solutions for managing traffic at the level of networks of various nature are known, for instance, from WO-A-01/39000, WO-A-01/65402, WO-A-01/61966, WO-A-01/59647, WO-A-01/55879, WO-A-01/52483.

However, at the moment there is no complete solution allowing to manage a CDN, in particular in regard to the checking/verification of the following aspects and/or functionalities:

actual availability of the contents and their updating at the level of the cache memories of the surrogate sites (Content Caching), testing for the presence of the distributed contents on the caching devices (Content Distributor), testing the algorithms for re-routing content requests towards the surrogate site with the best performance (Content Routing).

OBJECT OF THE INVENTION

The object of the present invention is to provide a solution that is able to meet the requirement of performing an effective monitoring/testing function on a CDN.

SUMMARY OF THE INVENTION

According to the present invention, said aim is achieved thanks to a method having the characteristics specifically set out in the claims that follow. The invention also refers to the related system, as well as to the corresponding computer product, i.e. to the product that can be directly loaded into the memory of a digital computer and that comprises software code portions able to carry out the method according to the invention when the product is run on a digital computer. The memory may take on the form of a (tangible) computer-readable medium having stored thereon executable instructions that, when executed by a computer, check the functionality of a Content Delivery Network.

In brief, the solution according to the invention provides for the use of particular testing procedures based on the use of fictitious contents (dummy content), i.e. control elements created for example by the network operator and inserted in the network itself to perform the role of sentinel on the functionalities of the network.

The possible use of fictitious contents in the field of telecommunication systems is known in itself from documents such as US-A-6 038 623 or US-A-6 222 752. These prior solutions, however, are intrinsically different from the solution of the present invention both in their application context and in their specific implementation procedures.

In particular, the solution according to the invention provides for the fictitious contents destined to perform the above-described sentinel role to be subjected to all operations normally undergone by any content provided by any Content Provider, when this content is distributed over a CDN. The presence of the fictitious contents therefore is perceived neither by the final user requesting contents, nor by the Content Provider making them available; the presence of the above-described fictitious contents therefore does not influence the performance of the network and of its devices. Nor is this presence intrusive, since the dimension of the fictitious contents can be maintained extremely small.

BRIEF DESCRIPTION OF DRAWINGS

The invention shall now be described, purely by way of non limiting example, with reference to the accompanying drawings, in which:

FIG. 1 shows, in the form of a functional diagram, the general operating criteria of a system according to the invention, FIGS. 2 through 6 show, also in the form of functional diagrams, various functionalities implemented in such a system, and FIG. 7 shows, again in the form of a functional diagram, a possible architectural arrangement of a system according to the invention.

BEST MODE FOR CARRYING OUT THE INVENTION

Figure 3:
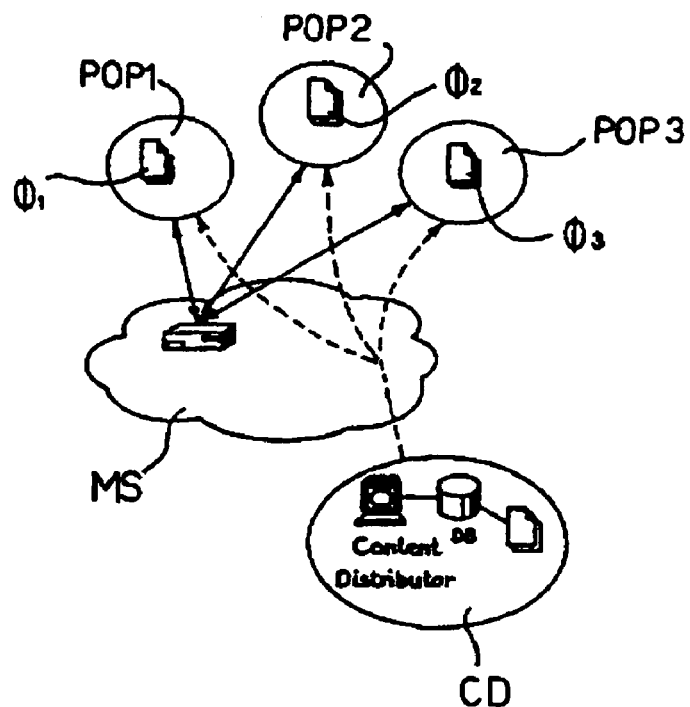

In the diagram of FIG. 1, the references POP1, POP2, POP3, etc. indicate a plurality of surrogate sites inserted in a CDN type of network.

The POP acronym was selected to take into account the name "Point Of Presence" currently adopted to indicate such sites.

Naturally, the fact that FIG. 1 shows three sites corresponds to a mere indication, since in fact any number of surrogate sites may be included in a network of the type described.

The solution according to the invention is based on the fact that it comprises a measurement system MS able to operate on fictitious contents distributed in each of the surrogate sites constituting the CDN. It will be appreciated in this regard that the measurement system MS can be located in any geographical position. At least in principle, it can also be physically located in a position that does not coincide with any node in the network. All this even though, naturally, the location in a network node is seen as a preferential selection because it makes it easier to provide the measurement system MS with good "visibility" with respect to the surrogate sites it controls.

The fictitious contents can be configured as HTML or text pages. As will become more readily apparent hereafter, these pages are preferably created according to specific criteria aimed at allowing to test determined functionalities of the CDN, such as the delivery of fresh contents by the cache memories and the geographic distribution of the contents.

Preferably, size is the same for all contents to allow-according to procedures described more in detail hereafter—a correct assessment of the response time and it is also globally small, to render the presence of the above-described additional contents in fact unperceived in terms of the operation of the network.

In the currently preferred embodiment of the invention, the fictitious contents made available at the various surrogate sites POP1, POP2, POP3, . . . are arranged in at least two sets.

A first set comprises fictitious contents whereto location information, for instance of the geographic type, is in some way associated. This result can be achieved (with reference to the possible configuration of the fictitious contents as HTML pages) operating both on the so-called URL (Uniform Resource Locator), and on the content of the pages.

For example this first set of fictitious contents can comprise pages $\phi(a)$, $\phi(b)$, $\phi$, . . . —i.e., in general, $\phi(i)$ identified by the same URL but with different contents, together with contents $\phi_1$, $\phi_2$, $\phi_3$, . . . (i.e., in general, $\phi_n$) associated with different URLs.

A second set of fictitious contents, generally indicated as $\phi$, is instead made uniformly available to all surrogate sites, such uniformity extending even in the presence of a single URL, hence without differentiation of any sort relative to the various sites whereto this second set of contents is addressed.

In practice, use of the fictitious contents $\phi$, $\phi(i)$, $\phi_n$ provides for their positioning in the different caching devices of the surrogate sites—according to the same procedures adopted by the CDN to position "normal" contents—and the subsequent periodic request for these contents by the measurement system MS to verify the operation of the CDN.

The fictitious contents can have within them such differences that they can be defined as contents provided with markings that distinguish them from each other. For some tests, during analysis operations, the need emerges to identify the site whereto the returned contents belong or their area of origin.

In the currently preferred embodiment of the invention, the fictitious contents are used to test the functionalities currently called Content Routing, Content Caching and, more in general, all the functionalities involving the geographic characteristics of the CDN.

In general terms, the implementation of the solution according to the invention provides for three basic functional steps, i.e.:

making the fictitious contents available in the various surrogate sites, requesting the fictitious contents, and analyzing the returned contents.

The three steps considered above are usually carried out with a periodic cadence suited to the typical times required by the operation of the network and by the evolution of its characteristics.

It will appreciated that carrying out the above-described steps does not necessarily require an isochronous type of evolution.

In the currently preferred embodiment of the invention, three testing actions are mainly performed, corresponding to the following functional areas of CDN's:

Content Caching, testing the functionalities dedicated to the temporary storage of the contents within the sites;

Content Distribution, testing the functionalities dedicated to the distribution of the contents in the surrogate sites and specifically on the cache of such sites, and Content Routing, testing the functionalities dedicated is to the determination of the site considered "best" (according to a given preference law) whereto the content requests are to be addressed.

In regard to the Content Caching area, the specific functionalities of the cache of each site are:

the storage of the contents and the delivery thereof on request, and the delivery of the updated content if made available by the Content Provider.

The availability of the contents can be verified by periodically fulfilling content requests effected in cyclical fashion by the measurement system MS.

In particular, after making available fictitious contents (for instance of the $\phi_n$ type) in the various caches, requests relating to the contents themselves are effected and it is verified that the content previously made available is correctly returned by the cache.

In regard, instead, to the verification of the freshness of the delivered contents, the checking procedure provides for verifying that the returned content is in fact the updated one. Supposing that the cache of a surrogate site contains a certain fictitious content responding to a determined URL and that its TTL life time has expired, the cache—before forwarding its content—will have to draw an updated copy thereof.

For this purpose, marked fictitious contents are used, i.e. contents with particular characteristics such as to make it possible to recognize the successful outcome of the operation.

To this end, $\phi_n$ type fictitious contents are preferably used, employing, to check content freshness, the mechanisms already present at the native http level or time markings effected ad hoc at the content level.

This manner of proceeding is schematically shown in FIG. 2 and essentially translates into the following steps:

periodically creating the marked update contents, making available the contents thus created on the server whereto the devices refer, to retrieve the contents to be renewed, periodically effecting a content request with a sampling period $\tau$ that exceeds the life time of the page (TTL), and final check, examining the returned page in order to search for the marking element that identified whether its content is the updated or the expired one.

In the diagram of FIG. 2 the reference SC identifies the site of the fictitious contents starting from which the new content is made available, by way of update, to any one of the surrogate sites, generically indicated as POP. The content request, effected by the measurement system MS, therefore enables to verify whether the new content has been correctly loaded in the POP site.

The diagram of FIG. 3 shows the criteria for testing the Content Distribution functionality.

It will be recalled that the main purpose of this functionality is to distribute the contents to the surrogate sites, in particular on the cache memories of these sites.

In this case as well, the testing procedure provides for the use of the marked fictitious contents $\phi_n$ seen previously.

In particular, through the Content Distribution element of the CDN, jobs are created in which the contents to be distributed are defined, as well as the time and date of the distribution along with the recipient caching apparatuses.

The procedure consists of:

distributing different contents $\phi_1, \phi_2, \phi_3, \ldots \phi_n$ on the cache memories of the various surrogate sites POP1, POP2, POP3, etc. starting from a content distributor CD, once the distribution is complete, through the measurement system MS, cyclically performing sample requests, verifying the availability of the above-described contents on each cache involved in the distributive event.

Figure 4:
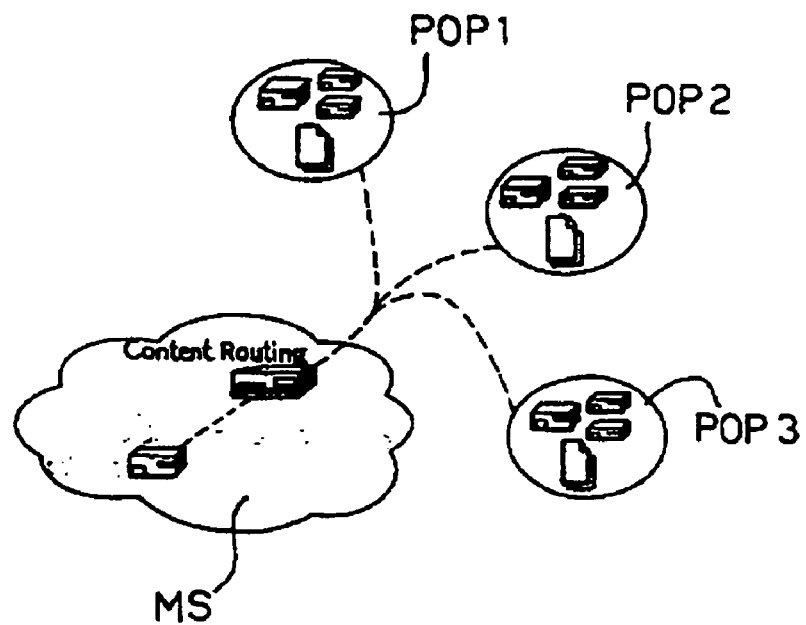

The diagram of FIG. 4 illustrates the criteria for testing the Content Routing functionalities.

As is well known, Content Routing is aimed at determining the best site whereto the content request is to be re-routed according to a determined rule. There can be several criteria for determining the surrogate site in question: for instance, they can be based on the response time of the individual surrogate sites, according to their workload or according to the geographic distance.

There are several rules whereby the CDN determines the "best site."

By way of example (the list provided herein does not exhaust all possible solutions) the criteria or rules for determining the best site can be the following:

selecting the site with the shortest response time, selecting the site according to the presence of the content, and selecting the site geographically closest to the final customer.

If site selection is to be oriented according to the time required to respond to a request, the method schematically illustrated in FIG. 5 can be adopted.

To re-route the request, Content Routing selects the site that, on average, responds in the shortest time. In this functionality, the response times affected by network parameters and the response times of each individual device the content must traverse are therefore determining factors.

In this case, referring to FIG. 5, the fictitious contents are distributed in each of the surrogate sites constituting the CDN, providing for distributing to the surrogate sites respective $\phi_1, \phi_2, \phi_3 \ldots, \phi_n$ contents corresponding to different URLs for each site.

Also distributed among all surrogate sites considered is a content of the $\phi$—or possibly of the $\phi(i)$—type having a single identifying URL.

Once the distribution is complete, the measurement system MS requires first the contents of the $\phi_n$ type, storing also the response times $t_n$ (n=1, 2, 3 . . . ) for each of them.

The measurement system MS then requests the $\phi$ type content and the Content Routing of the CDN, according to its selection algorithms, selects the site considered best and forwards the request thereto. The measurement system stores the response time T of the site that returned the requested content, whichever it is.

At this point, the system MS processes the collected times to and determines the mean of the expired times Tn—for each individual site.

This is achieved according to the relationship $$T_n^- = \Sigma^M_{k=1} t_{n,k}/M, \forall n=1, \ldots, N$$

where $t_{n,k}$ is the response time of the $n^{th}$ surrogate site in the sampling instant k, M is the number of collected data, N is the number of surrogate sites present.

Lastly, the system verifies the condition $$|T - \min_n T_n^-| \Rightarrow 0$$

so that the more T approaches $\min_n T_n^-$, the better the distribution algorithm works.

If, instead, site selection takes place according to content availability, the test is conducted according to the same criterion described above for verifying content availability (see for instance the diagram of FIG. 3).

If the Content Routing element determines the best site as the site that—at the network organization level—is the closest site to the user whereat the requested content is available, reference can be made to two possible approaches.

The first approach provides for referring to the user's local DNS (Domain Name Server). The second approach instead provides for directly referring to the user's IP address.

The Content Routing function determines, in both cases, the closest surrogate site (at the network organization level) using proximity tables or "proxy tables," where, given an IP address, the closest surrogate site can be determined immediately.

The principles whereon the method for testing this functionality are based are substantially similar to those described heretofore, in particular in regard to the use of marked fictitious contents of the (i) type: geographic areas are marked with a same fictitious content always having the same URL, but providing for marking each content in such a way as to enable to determine, when verifying the returned content, the area whereto it belongs.

In this case, the measurement system MS can operate, so to speak, positioning itself on the territory effecting different requests from different geographic locations of the territory, as schematically shown in FIG. 6. The figure shows that the center for managing the system according to the invention, indicated as MC, operates emulating requests made from different geographic locations, thus reproducing the behavior of corresponding users accessing the network from different points of the territory.

The system then verifies whether the delivered content belongs to the area near the one where the content request originated. This verification is made possible by the availability of the information and can be deduced by the analysis of the marker present in the content which identifies in unequivocal fashion the area of origin.

The diagram of FIG. 7 shows in even greater detail a possible architectural solution which can be adopted to implement the system according to the invention.

The system according to the invention can be implemented using one or more distributed elements, usually located in correspondence with the surrogate nodes and/or in points located within the Internet. these distributed elements, with "agent" function, are essentially tasked with measuring the correct operation of the algorithms and with collecting data.

A centralized element, serving as management center (or "manager") MC, is usually located in the CDN management center as the centralized element dedicated to processing and analyzing the data collected by the various elements serving as agents. this function can be integrated with the CDN management center.

The purpose of the network is the distribution of the contents to the cache memories of the various surrogate nodes and their utilization by the final users; it is in fact on the content, the fundamental element of the CDN, that the principles for testing the functionalities and for checking the distribution implemented by the elements that serve as agents are based.

The solution according to the invention can thus be seen as such as to give rise to a sort of additional Content Provider, indicated as CPI, which is provided in such a way that the CDN in practice treats it in the same manner as all the content providers that employ the service of the CDN itself. The "additional" Content Provider CPI therefore serves as element tasked with distributing the fictitious contents in the sites of the CDN through the Content Distributor thereof.

The manager-agent measurement system described above instead is tasked with cyclically verifying the status of the contents distributed by the additional Content Provider CPI.

In particular, each agent serves as an interrogation and measurement device, implementing the verification procedures and managing the request for fictitious contents towards the apparatuses constituting the CDN. The request for fictitious contents, depending on the verification procedure to be carried out can be programmed and effected cyclically. The physical location of the elements serving as agents, distributed in different points of the network, identifies the point of generation of the measurement destined to be taken into consideration during the analysis step.

The function of the MC module serving as manager instead is to process the collected fictitious content data. It analyses the collected data, for instance searching for particular markers whose presence or absence can indicate the successful outcome of the procedure or else notify the malfunction of the tested functionalities.

Naturally, without changing the principle of the invention, implementation details and embodiments may vary widely relative to what is described and illustrated herein, without thereby departing from the scope of the present invention.

The invention claimed is:

1. A method for checking the functionality of a Content Delivery Network, wherein contents made available by at least one Content Provider are made available to a plurality of surrogate sites accessible to users, the method comprising the steps of:

distributing to the plurality of surrogate sites selectively recognizable fictitious contents for positioning at the plurality of surrogate sites, said fictitious contents comprising control elements configured to perform a sentinel role with respect to a functionality of the Content Delivery Network, verifying the availability of said fictitious contents in said surrogate sites, including in said fictitious contents made available in said surrogate sites a first set of fictitious contents at least partially differentiated for each surrogate site, and requesting the Content Delivery Network, during said verification step, to deliver fictitious contents of said first set, wherein said fictitious contents are unperceived by the users, and wherein said fictitious contents do not influence a performance of a delivery of the contents made available by the at least one Content Provider to user computers associated with said users.

2. The method as claimed in claim 1, further comprising the step of:

making said fictitious contents inaccessible to said at least one Content Provider.

3. The method as claimed in claim 1, further comprising the step of:

including in said fictitious contents time information data, wherein said step of verifying the availability of said fictitious contents in said surrogate sites includes verifying said time information data.

4. The method as claimed in claim 1, further comprising the steps of:

defining location information identifying the location of said surrogate sites, including in said fictitious contents said location information, and verifying, in association with the step of verifying the availability of said fictitious contents, the correspondence of said location information with the location of each of the surrogate sites.

5. The method as claimed in claim 4, wherein said step of verifying the correspondence of said location information is performed in distributed fashion effecting corresponding content requests from corresponding geographic locations.

6. The method as claimed in claim 1, further comprising the steps of:

requesting the Content Delivery Network to deliver contents of said first set, and measuring corresponding response times of the Content Delivery Network.

7. The method as claimed in claim 6, wherein the corresponding response times are measured as a mean of expired times for each surrogate site.

8. The method as claimed in claim 6, further comprising the steps of:

including in said fictitious contents a second set of fictitious contents with identical contents for said surrogate sites, requesting the Content Delivery Network to deliver contents of said second set, measuring a relative response time of the Content Delivery Network, determining the minimum among said corresponding response times, and comparing said relative response time with said minimum of said corresponding response times.

9. The method as claimed in claim 8, further comprising the step of:

determining a functionality index of said Content Delivery Network starting from a deviation between said relative response time and said minimum of said corresponding response times.

10. The method as claimed in claim 1, wherein the partial differentiation of said first set of fictitious contents for each surrogate site includes a partial differentiation of data included in said first set of fictitious contents.

11. The method as claimed in claim 10, wherein the first set of fictitious contents is identified by a common uniform resource locator (URL).

12. The method as claimed in claim 1, further comprising the step of:

delivering said fictitious contents to said user computers.

13. A system for checking the functionality of a Content Delivery Network, the system comprising:
- a Content Provider (CPI) device configured to distribute fictitious contents to a plurality of surrogate sites for positioning at said plurality of surrogate sites, said fictitious contents comprising control elements configured to perform a sentinel role with respect to a functionality of the Content Delivery Network; and
- at least one agent device in an offset position within the Content Delivery Network configured to verify the availability of said fictitious contents at a level of said surrogate sites,
- wherein said fictitious contents made available in said surrogate sites include a first set of fictitious contents at least partially differentiated for each surrogate site,
- wherein the Content Delivery Network is requested to deliver fictitious contents of said first set during the verification,
- wherein said fictitious contents are unperceived by final users, and
- wherein said fictitious contents do not influence a performance of a delivery of contents made available by the Content Provider (CPI) device to final user computers associated with said final users.

14. The system as claimed in claim 13, wherein the Content Provider (CPI) device is configured to convey said fictitious contents in transparent fashion with respect to the operation of the Content Delivery Network.

15. The system as claimed in claim 13, further comprising:
- a centralized management element for processing data delivered by said at least one agent device in an offset position and in that said at least one agent device in an offset position and said centralized management element are configured according to an agent-manager architecture.

16. The system as claimed in claim 13, wherein said fictitious contents are configured to be delivered to said final user computers.

17. A non-transitory computer-readable medium having stored thereon executable instructions that, when executed by a computer, check the functionality of a Content Delivery Network by performing:
- distributing to a plurality of surrogate sites selectively recognizable fictitious contents for positioning at said plurality of surrogate sites, said fictitious contents comprising control elements configured to perform a sentinel role with respect to a functionality of the Content Delivery Network,
- verifying the availability of said fictitious contents in said surrogate sites,
- including in said fictitious contents made available in said surrogate sites a first set of fictitious contents at least partially differentiated for each surrogate site, and
- requesting the Content Delivery Network, during said verification step, to deliver fictitious contents of said first set,
- wherein said fictitious contents are unperceived by final users requesting content from said Content Delivery Network, and
- wherein said fictitious contents do not influence a performance of a delivery of content made available by at least one Content Provider to final user computers associated with said final users.

18. The non-transitory computer-readable medium as claimed in claim 17, wherein the executable instructions include at least one instruction that, when executed by the computer, performs:
- delivering said fictitious contents to said final user computers.

19. The non-transitory computer-readable medium of claim 17, wherein the partial differentiation of said first set of fictitious contents for each surrogate site includes a partial differentiation of data included in said first set of fictitious contents, and
- wherein the first set of fictitious contents is identified by a common uniform resource locator (URL).

* * * * *